United States Patent [19]

Wiener

[11] 3,771,145

[45] Nov. 6, 1973

[54] ADDRESSING AN INTEGRATED CIRCUIT READ-ONLY MEMORY

[76] Inventor: Patricia P. Wiener, 12 Thornwood Rd., Armonk, N.Y. 10504

[22] Filed: Feb. 1, 1971

[21] Appl. No.: 111,193

[52] U.S. Cl. .......................... 340/173 R, 340/173 SP

[51] Int. Cl. .......................... G11c 17/00, G11c 7/00

[58] Field of Search ................. 340/173 R, 173 CA, 340/173 SP

[56] References Cited

UNITED STATES PATENTS

| | | | |
|---|---|---|---|
| 3,613,055 | 10/1971 | Varadi | 340/173 SP |
| 3,533,088 | 10/1970 | Rapp | 340/173 R |
| 3,483,528 | 12/1969 | Koerner | 340/173 R |
| 3,560,942 | 2/1971 | Enright | 340/173 R |
| 3,331,061 | 7/1967 | Marcus | 340/173 R |
| 3,659,275 | 4/1972 | Marshall | 340/173 SP |
| 3,618,050 | 11/1971 | Heeren | 340/173 SP |

OTHER PUBLICATIONS

Beausoleil, Shift Register Storage, 10/70, IBM Technical Disclosure Bulletin, Vol. 13 No. 5, pp. 1336–1337.

Abbas, Electrically Encodable Read–Only Store, 11/70, IBM Technical Disclosure Bulletin, Vol. 13 No. 6, pp. 1426–1427.

Bracco, Write–Once Read Only Store, 10/70, IBM Technical Disclosure Bulletin, Vol. 13, No. 5, p. 1308.

*Primary Examiner*—Bernard Konick
*Assistant Examiner*—Stuart N. Hecker
*Attorney*—Smyth, Roston & Pavitt

[57] ABSTRACT

A read-only memory of the MOS variety with address decoder, memory matrix and internal control for byte string extraction and sequencing. Beginning of a byte string is separately controlled, termination of extraction is redundantly established. Two chips can operate in phase opposition for doubling the overall byte string extraction rate from locations identified by a single address.

23 Claims, 7 Drawing Figures

INVENTOR:
Patricia Wiener
By Smyth, Roston & Pavitt
ATTORNEYS

INVENTOR:
Patricia Wiener
By Smyth, Roston & Pavitt
ATTORNEYS

INVENTOR:
Patricia Wiener
By Smyth, Roston & Pavitt
ATTORNEYS

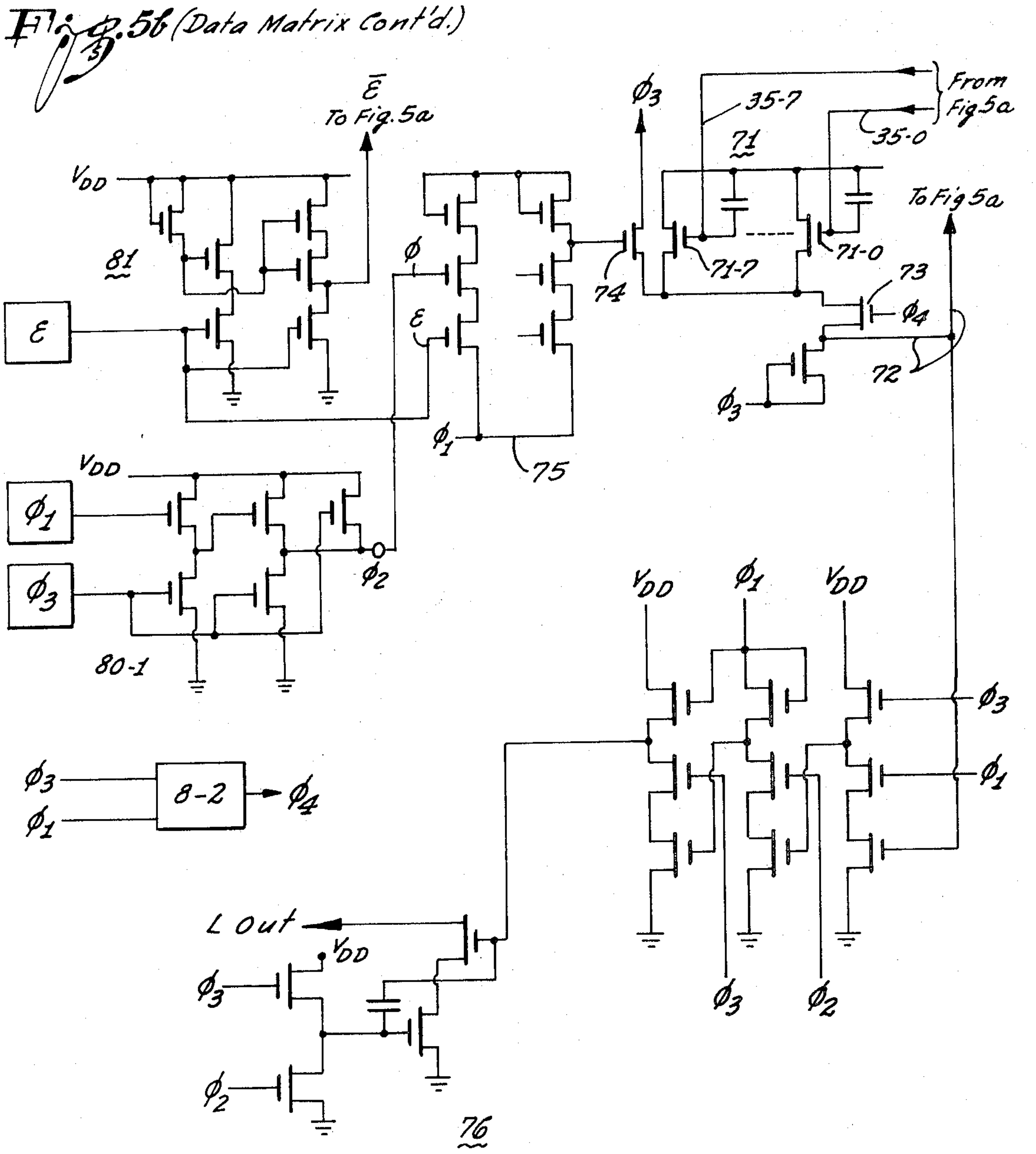
Fig. 5b (Data Matrix Cont'd.)
INVENTOR:
Patricia Wiener
By Smyth, Roston & Pavitt
ATTORNEYS

ADDRESSING AN INTEGRATED CIRCUIT READ-ONLY MEMORY

The present invention relates to a new, high access speed, high cycle time data output rate, large scale integrated memory read-out circuit.

The purpose of the invention is to provide an integrated circuit chip from which stored data can be extracted at high speed in a serial parallel operation. The invention particularly relates to read-only memory of the MOS-variety with insulated gate type active elements (FET's).

Read-only memories find utility in various fields of application. Among them is storage of micro-programs or code conversion for immediate control of composite character display in an "8" or a starburst or an even more elaborate pattern. In these and other cases relative large amounts of data bits are to be made available, preferably in a particular format and in a short period of time. The integrated circuit chip constructed in accordance with the invention is designed to render the bits of a group (byte) available in parallel and several groups or bytes are presented in sequence (byte string) in response to a single addressing operation. Moreover, the inventive design permits extraction of variable length byte strings, also in response to a single addressing operation. The integrated circuit chip has a particular layout that can be divided into memory cells proper and controls. Upon making the chips, the masks are uniform as to the controls, also as to the general layout and arrangement of the cells, but differ as to the logical content of the cells. Two such chips differing only in this respect and addressed concurrently, but operated by an external two phase clock in phase opposition can thereby be operated to present their outputs alternately, i.e., interleaved or interdigitized, so that twice the amount of data are made available in the same format, i.e., as multi-bit bytes, and in the same period of time as far as presentation of all byte strings of the memory word location, having the same address in both chips, is concerned.

In essence, the memory is a three dimensional memory projected into the two dimensions of an LC-chip. The three dimensions are: bit positions; word locations; byte numbers. However, byte number and bit position are collapsed into a single dimension, so that the data are organized in a plane in which one dimension differentiates among addressable word location and the orthogonal direction has bit positions on a repetitive bases, the repetition defining the byte number.

The inventive read-only memory has the following features. Word address bits, i.e., an address word is applied from the exterior to the circuit. A plural byte, single word location is accessed through a decoder responding to such an address word. The entire content of that location is rendered available on (internal) memory output lines, also called data extraction columns. A presettable byte counter is provided for selective outputting. The counter may be a regular counter (binary, Johnson etc.) or a shift register. A selector gate or read select circuit has as many bit select circuits as there are bits in a byte, each representing a bit position within a byte. Immediately upon addressing the counter runs through its count states, and for each state a different plurality of memory data extraction columns (corresponding to a different byte number) is coupled to the bit output circuits. These output circuits taken together provide the several bytes in parallel by bit format and serially in rapid sequence as the counter advances.

Word addressing in memory concurs with loading a particular count number into the counter, to determine the beginning of byte string extraction. By external control, read-out can be stopped before the last one of the bytes in the sequence of extraction has been read-out. This way, the length of a byte string to be extracted from one word location and by one addressing step is varied.

As the circuit is preferably constructed as an MOS-chip, the accessing operation is initiated, and in parts preceded, by a set up operation that includes pre-charging all of the decoders, all of the addressing inputs for the memory, and all of the data extraction columns thereof as leading to the selection inputs. Sequentially, pre-charging is released and discharge takes place in all but one of the decoder circuits as selected by the address code. Thereafter, the pre-charge of the data lines is released, and, depending on the content of the addressed word location, some of the data columns remains charged others are discharged. The charged ones remain charged throughout the byte extraction sequence.

A word read-out operation is internally terminated through count completion or by selecting one of the bytes as a control byte of particular format that can be recognized as no-data. For example, it may be an all-zero-bit byte to hich a particular decoder responds. In either case, the circuit is latched to a reset condition that is dynamically maintained upon continuation of the clock. This way, the read-only memory can be made randomly accessible as to individual bytes due to byte addressing by counter presetting and selecting the next byte to be an all-zero byte.

The initial set-up breaks the latch and sets up also the counter to the present initial count number. As already stated, read-out can also be terminated by an externally developed signal. Two such chips can be operated in parallel as to word address and byte count preset, also as to output. This way, the content of each word location is doubled as to bits and number of bytes. The number of bits per bytes is not changed, if an external two phase clock is applied in the reverse to the two chips to cause them to operate interleaved for alternate outputting and, in effect, doubling of the data rate.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Figure 1:
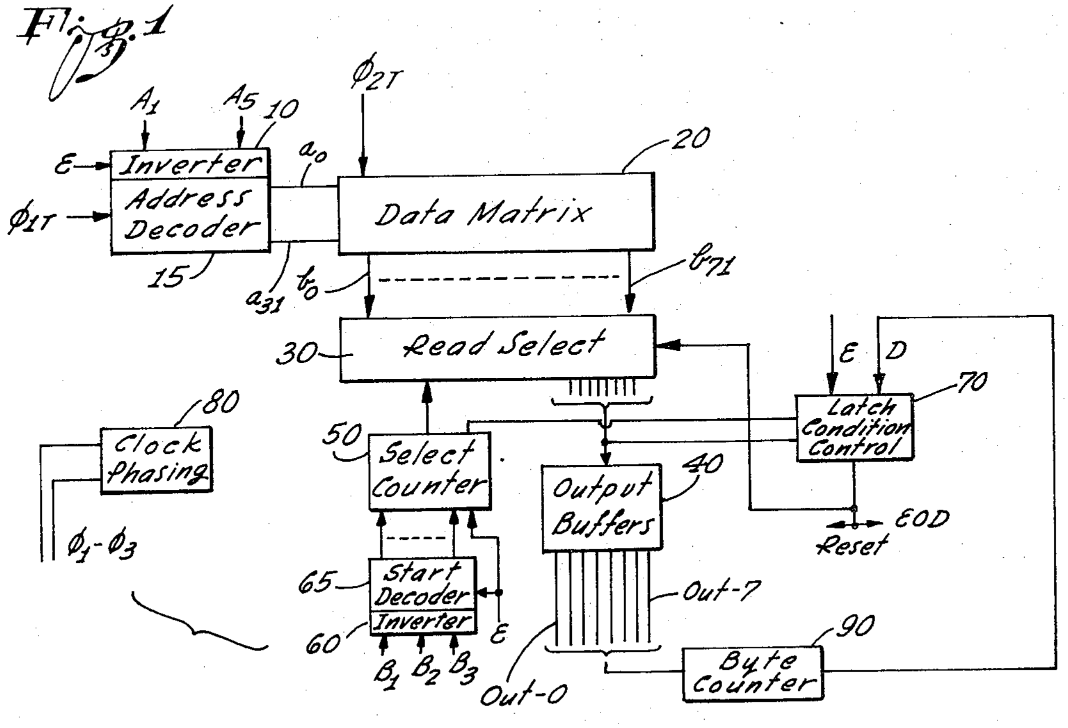
FIG. 1 is a block diagram of the read-only memory constructed in accordance with the preferred embodiment of the invention.
Figure 6:
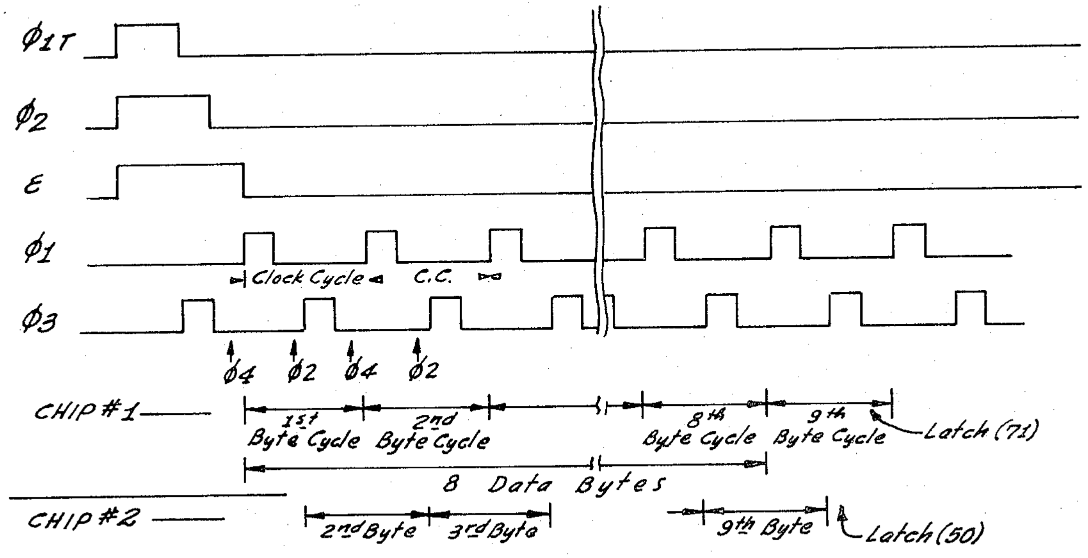
Figure 5A:
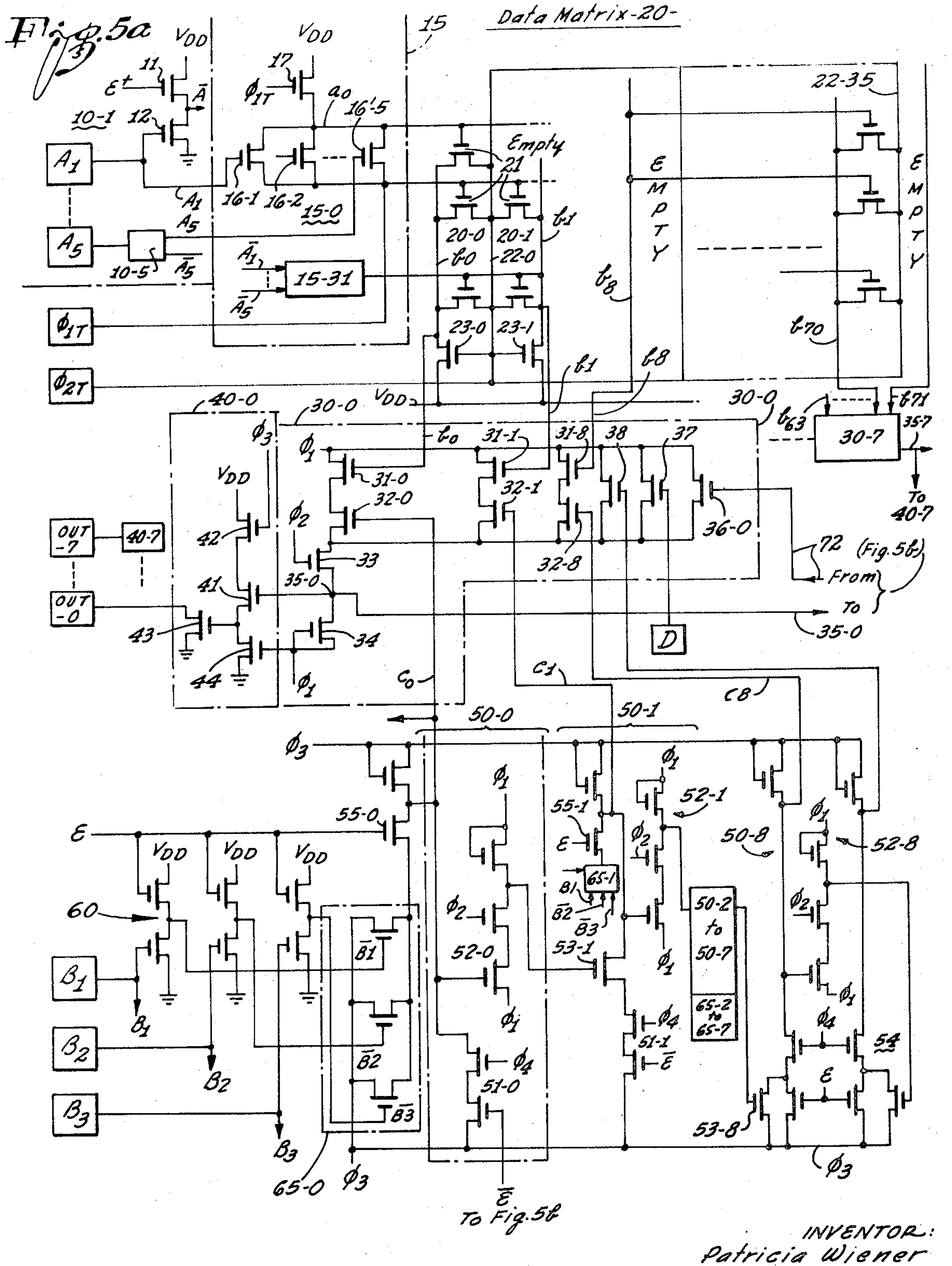

FIGS. 5*a* and 5*b* illustrate detailed circuit diagram of representative examples of components and circuits as used in the ROM-chip in question and interconnected to illustrate the entire circuit layout of the block diagram shown in FIG. 1; and FIG. 6 illustrates an operational timing diagram.

The circuit illustrated in FIG. 1 includes a plurality of input terminals for receiving the various operational signals from outside of the chip. Among them are the location address signals $A_1$ to $A_5$; external phase signals $\phi 1$ and $\phi 3$ in alternating, spaced-apart sequence; the setup signals $\phi 1T$, $\phi 2T$, E, all providing phase signals that concur with the presentation addressing bits $A_1$ etc. The set-up signals may have common leading edge but should have sequential release. This sequential release is important not only for timing commencement of operation but for supplying sufficient power. Next, there is the external (possibly asynchronous) disable signal D to stop any read-out in progress. Addressing signal B1, B2, B3, provide bit string length selection and VDD (FIG. 5*a*) is the operating dc power supply voltage.

Figure 4:
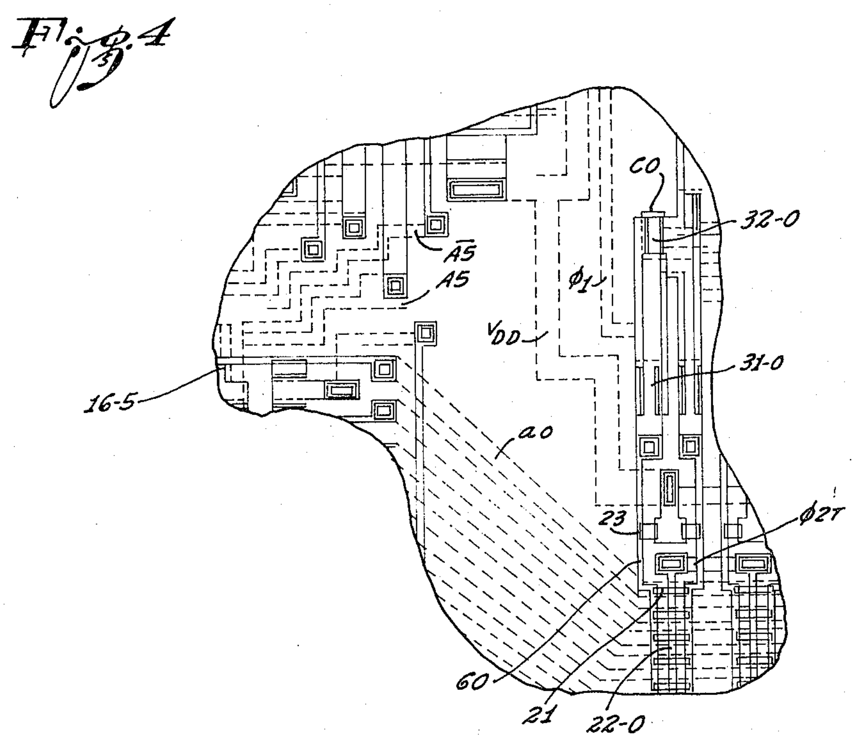
FIG. 4 illustrates schematically the topological layout of the ROM-chip as illustrated otherwise in the preceding figures.

Preceeding now to the circuit, the input address signals $A_1$ to $A_5$ are applied to inverters 10 to form the required complements, and the signals $A_1$, $\bar{A}_1$, $A_2$, $\bar{A}_2$ etc. are next applied to a full decoder 15 having $2^5 = 32$ output lines $a_0$ to $a_{31}$. The inverters 10 (as well as inverters 60, infra) are set up in response to signal E, the decoders 15 are set up in response to signal $\phi 1T$. It can be seen from the topologic scheme of FIG. 4, the output lines $a_0$ to $a_{31}$ lead to plating runs or strips to constitute gate electrodes in FET's of a data matrix 20.

The data matrix 20 on the IC-chip is comprised of an array arrangement of (for example) P-zones in an n-type substrate, extending in one direction of the matrix, for example as columns thereof. This arrangement is more fully shown in FIG. 4. Some of these runs of P-zones are permanently connected to ground; they are selected so that each P-zone run which is not grounded, is flanked by but one run that is grounded. Two such P-zones define a data column. Intersections are defined where the gate plating strips as matrix rows pass across respective non-grounded P-zones. Such an intersection defines *an* addressable memory location to the bit level or bit cell. If that area together with the closest, grounded P-zone is developed as a transistor (through thinning of the oxide layer on the chip), the location defines a stored bit of value "one"; if the area is not developed as a transistor the location defines a bit of value "zero."

All non-(permanently)grounded P-zones define memory extraction columns. There are, for example, 72 such columns $b_0$ to $b_{71}$, corresponding to 72 locations to the bit level for one addressable location to the word level. Upon providing gating-addressing voltage to one of the addressing lines $a_0$ to $a_{31}$, all transistors developed thereunder are rendered conductive, and the potential of all columns $b_0$ to $b_{71}$ at that time is indicative of the respective bits of that 72-bit word then read-out.

Figure 2:
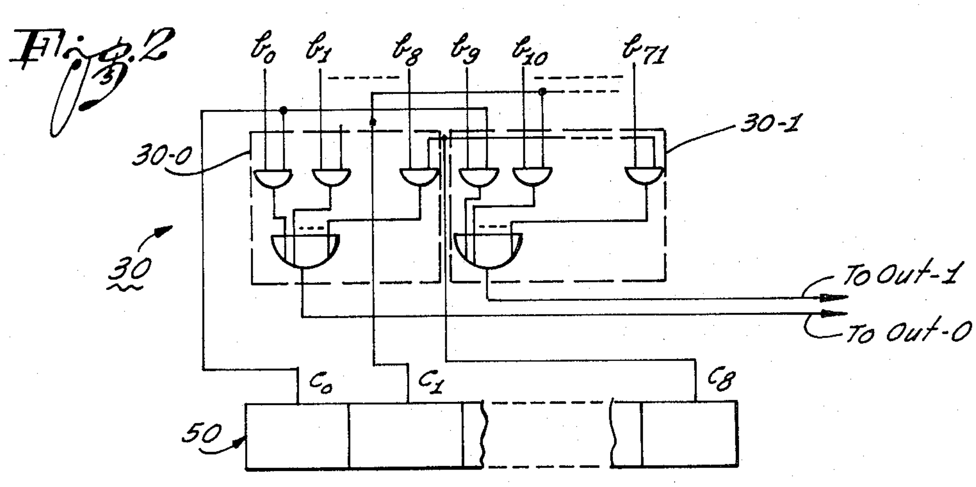
FIG. 2 illustrates a logic diagram of a detail (bit-byte selection)

The 72 output or extraction columns of the ROM-data matrix 20 are connected to a read select and bit merge circuit 30. The circuit 30 is comprised essentially of gates with ight output lines leading to eight output buffers 40 from which output signals are extracted externally. The select circuit 30 extracts eight bits (one byte) in parallel out of the 72 bits as presented upon addressing of a word location. The select circuit 30 has these 72 data extraction columns $b_0 \ldots b_{71}$ as input and includes a corresponding number of AND gates, organized in groups of nine each. This "AND-OR" arrangement is schematically shown in FIG. 2. The outputs of respective nine AND gates are OR'd together to provide one output that is applied to one input terminal of a buffer, having an output terminal. There are eight such OR gates corresponding to eight bits per byte and feeding eight buffers 40 having output terminals designated OUT-0, 2, . . . 7.

The selection of the AND gates for each OR gate is under control of a select counter 50. The counter may be regular binary counter or a shift register with nine output lines $C_0$ to $C_9$, each line being fanned-out eight fold, to provide concurrent gating signals to eight AND gates of the select circuit 30. The counter signals provide gating for but eight out of seventy-two AND gates as only one out of nine counter outputs is true at a time. Thus, counter 50 controls coupling of the data extraction columns $b_0$ to $b_{71}$ to buffer output lines OUT-0 to OUT-7 in that eight data extraction columns are so coupled concurrently, and each buffer output is sequentially coupled to nine different data lines in progression of the counter.

Thus, for count state 0, column $b_0$ is coupled to OUT-0, column $b_9$ is coupled to OUT-1, column $b_{18}$ is coupled to OUT-2, etc., and column $b_{63}$ is coupled to OUT-7. For count state 1, column $b_1$ is coupled to OUT-0, column $b_{10}$ to OUT-1 . . . column $b_{64}$ to OUT-7. For count state 2, column $b_2$ is coupled to OUT-0, $b_{11}$ to OUT-2, $b_{20}$ to OUT-3, etc., $b_{65}$ to OUT-7. After nine counter clock times, upon count state 8, column $b_8$ is coupled to OUT-0, etc., $b_{71}$ to OUT-7. Thus, the 72 bits of each word location of the memory are extracted from and called up in the data matrix in form of a byte string of nine bytes (or less as will be described), each byte having, of course, eight bits presented in parallel on the buffer output. During this time, the entire particular word location remains gated on, and the bit and byte extraction is carried out through the counter and sequencer 50.

The second set of addressing signal B1, B2, B3, is applied to inverters 60 to form the complementary signals, and signals B1, $\overline{\mathbf{B1}}$, B2, etc., are decoded in a full decoder 65. The eight different outputs of this $2^3$ decoder are coupled to the first eight (i.e., all except the last) stages of counter 50, to determine the count state at the begining of read-out operation. For extraction of the full length string of a word location, the counter code is B1 = B2 = B3 = 0, and the first counter state is established for the counter to begin the extraction sequencing with the first byte in the addressed word location and as defined by the eight bits on columns $b_0$, $b_9$, etc. For a different, not all-zero bit combination B1, B2, B3, counter 50 is set to a correspondingly different state from which to shift, and to advance, so that some of the bytes of the word location are not called up and extracted (though available).

A byte string counter 90 may be provided externally, subject to external control as to the length of the byte string to be read, particularly in case read-out is to be terminated before the last one of the bytes within the call-up sequence has been read. That counter 90 may produce the termination signal D. Thus, upon addressing a word location, all eight data bytes of that location could be presented as a byte string in eight sequential clock cycles. Numbering these bytes 0 to 7 with an ninth byte being all zeros, these bytes are presented in that sequence. In dependence upon the code B1, B2, B3, the byte call up sequence can actually begin with byte No. 1, or byte No. 2 etc. Upon selecting the timing of production of signal D, the read-out sequence can be terminated before the eight's byte has been presented. Note that all bytes are always read-out and set into columns $b_0$ to $b_{71}$ and the restriction of byte extraction is operative only as restriction as to which bytes are being called upon by the counter 50.

The inverters 10 and 60, decoders 65, the stages of counter 50 and latching circuit are all set, i.e., prepared and pre-charged, by set-up signal E having longest duration. The same holds true for a latching circuit 70. The circuit 70 is actually a decoder that responds to one of three conditions which ever occurs earliest, to clamp the operational state of the circuit to an all-zero condition out of which it can only be raised by the triplex of control inputs $\phi$1T, $\phi$2T and E.

The reset latch condition may be established upon decoding the last byte, if it has only "zeros" (or "ones," depending on definition). Latch condition decoder 70, as connected to the output lines of read selector 30, responds and clamps the outputs thereof to zero. Additionally, the last shift state of counter 50 has the same result, but only *after* outputting of the ninth byte has been enabled. Finally, the latch circuit 70 responds to the externally produced signal D that is in fact a read-halt signal and may be produced, for examle, because the output circuit cannot accept any longer the data supplied by the ROM, or because of intentional format and content restriction in the particular case as determined, for example, by the counter 90.

The circuit is completed by the internal phase clock 80. External phase signals, called $\phi$1 and $\phi$3, are processed herein to produce interspaced clock pulses $\phi$2, $\phi$4, so that a four phase clock is available. A full cycle $\phi$1–, $\phi$2–, $\phi$3–, $\phi$4– has, for example, about 200 nanosecond period, each pulse, thus, having about 50 nsec. duration. A first (dummy) cycle begins and covers about the period ofE. At the trailing edge of E, $\phi$1 of the first operating cycle occurs and the first byte is read-out, "first" to mean here as determined by the byte string begin code (B1, B2, B3).

Figure 3:
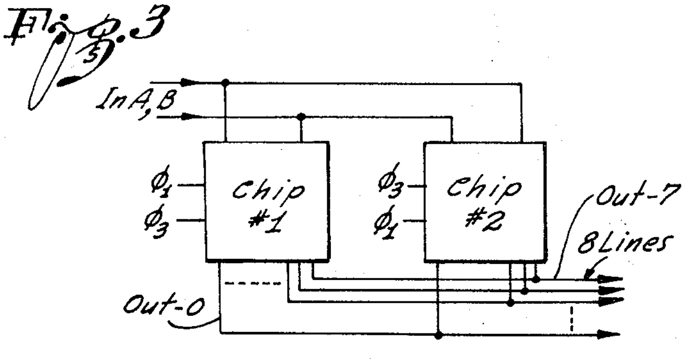
FIG. 3 illustrates schematically the operation of two ROM-chips in parallel but interleaved through clock phase reversal.

In case a chip is used with external clock $\phi$1 and $\phi$3 reversed, such a chip operates at a 180° phase shift (100 nsec.) as far as each byte read cycle is concerned. As bits are presented for each 100 nsec., bit presentation by *a* chip is on intermittent basis and two chips operated in phase opposition, thus, provide bytes on an alternating basis. This mode of operation is used in the circuit of FIG. 3. There are two substantially similar chips No. 1 and No. 2, each constructed as schematically shown in FIG. 1, but operated in phase opposition as defined; otherwise they receive the same addressing signals and are set up concurrently. As each chip presents its bytes (for a single addressed word) at a 5 Mhz rate, two chips operating interleaved together present twice the number of bytes in the same time corresponding to a rate of 10 Mhz. As each chip presents eight bytes, two chips together present sixteen bytes within the same period of time.

The two chips differ slightly as to content of the ROM matrix (other than the expected difference from chip to chip). The chip operating delayed relative to the other one has a dummy column as a first column, as for reasons of relative timing, that column cannot be properly read. A latch-out-all-zero-column is provided as last column of the other chip for termination. The delayed operated chip provides reset latching in response to counter control thereon. These points are mentioned here only summarily, they will become more apparent below and pursuant to the detailed description of the circuit shown in FIG. 5.

In FIG. 5, boxes with letters denote schematically the lead-in electrodes and immediate input circuitry involved for receiving input signals as designated by these letters (A, E, D etc.) A circuit 80–1 produces phase clock $\phi$2 out of $\phi$1 and $\phi$3, a circuit 80–2, similarly constructed but connected to phases $\phi$1 and $\phi$3 in the reverse, produces $\phi$4. An inverter 81 produces $\overline{E}$ out of E (see portion 5*b* of FIG. 5).

The addressing input signals A1 . . . A5 pass through inverters such as 10-1 with signal E serving as gate control for one of two transistors 11 and 12 connected in series. Transistors 11 and 12, when conductive, have impedance ratio so that low voltage is passed as signal $\overline{A1} = 0$; for $A1 = 0$ only one transistor is conductive and applies VDD (minus transistor threshold) as signal $\overline{A}_1 = 1$. There are similar inverters for the other addressing signals, and collectively they constitute the inverter circuitry 10.

The, altogether 10 signals $A_1$, $\overline{A}_1$, $A_2$ . . . etc., as they appear in any instant, are processed in decoders 15 such as decoder 15–0 for responding particularly to the address $(A_1, A_2 \ldots A_5) = (0, \ldots, 0)$. There are thirty-two such decoders, 15–0 through 15–31. Each decoder is constructed from five FET's, such as 16–1, 16–2, . . ., 16–5 for decoder 10–0, and the respective five FET's are connected parallel. The five transistors of a decoder are connected to a plurality of five signal lines selected from the 10 lines that receive the signals $A_1$, $\overline{A}_1$, $A_2$, $\overline{A}_2$ etc. A decoder, such as 15–0 responds if *none* of its five transistors is rendered conductive. Thus, the five transistors 16–1, . . . 16–5, receive the five signals $A_1$, $A_2$, . . . $A_5$, so that for $A_1 = A_2 = \ldots = A_5 = 0$ none of these transistors is rendered conductive. The other decoders receive different signal combinations, decoder 15-31 receives $(\overline{A}_1 \ldots \overline{A}_5)$.

The interconnected source electrodes of the five FET's, pertaining to a decoder, are biased to negative potential by signal $\phi$1T, while for $\phi$1T = 0 ground potential prevails on these source electrodes. Hence, *all* decoders are so biased by signal $\phi$1T. The drain electrodes of the five transistors of a decoder are connected to a transistor such as 17 pertaining to the particular decoder 15–0 and connecting biasing voltage VDD to the interconnected drain electrodes upon and for the duration of $\phi$1T, controlling the gate potential of transistor 17. The interconnected drain electrodes (as a P-zone in the IC-chip) of the five decoder transistors 16–1 etc. lead to the gate plating $a_0$ for addressing the lowest address word location on and along that plating in the data matrix. Gate plating $a_0$ establishes a node on the interconnected drain electrodes of the decoder transistors and that node is charged on $\phi$1T.

The other 31 decoders are similarly constructed, similarly biased and have similar pre-charged nodes that lead to and are established by the addressing lines $a_1$ to $a_{31}$. Each line serves as gate plating strip for a 72 bit locations of the data matrix; *all* of these addressing lines are pre-charged as nodes.

As signal E has duration longer than signal $\phi$1T, the d-c control of the ivnerters persists beyond the decoder pre-charge period to facilitate establishing of charge and discharge conditions of the several capacitances as establishing the nodes. Upon addressing and after release of signal $\phi$1T, all but one of the nodes on lines $a_0$ to $a_{31}$ are discharged as all decoders but one have at least one FET conductive to permit node discharge through the now grounded line that provided $\phi$1T during the precharge-set-up period and to which all decoder FET's have their source electrodes connected. The node and address line that is not discharged controls, in turn, discharge through transistors of the data matrix to which I now turn.

The data matrix includes addressing gate lines $a_0$ . . . $a_{31}$ as defining the rows of the matrix. The matrix columns are deonted 20–0, 20–1, . . . 20–71. They are established by and between pairs of runs of P-zones extending orthogonal to the rows. Each such pair of P-zones is crossed over by all 32 addressing lines and defines 32 bit cells, one bit position each for all 32 word locations. Each data column is established by two adjacent P-zones, one thereof serving as a data extraction column. There are 72 extraction columns, $b_0$ to $b_{71}$. Take data column 20–0, it has data extraction column $b_0$ as well as a second P-zone, denoted here 22–0.

The P-zone $b_0$ serves as a drain electrode and zone 22–0 as source electrode for transistors on the data column establishing a particular bit value. Any developed transistor in the data matrix and particularly in an intersection of an addressing line, and of a data column establishes a bit of particular value as stored in that intersection. Transistor 21 is, for example, connected with its gate to line $a_0$ in representation of bit value 0 (or of a 1, the assignment is arbitrary) in the first bit position of the lowest address word location. Absence of a developed transistor in such an intersection establishes a stored bit of complementary value in that bit cell.

There must be one extraction column per data column, but the additional P-zones, such as 22–0, are provided in between respective two extraction columns, such as 20–0 and 20–1 and are, thus, shared by adjacent data columns. The columns 22–0 and others are biased by set-up signal $\phi$2T but are held to ground potential thereafter, to establish source electrode potential for the various transistors of the data matrix.

The data extraction columns $b_0$ . . . $b_{71}$ are themselves nodes, and *all* of them are pre-charged on set-up time, concurrently and also by signal $\phi$2T. For this, each data column is connected to voltage source VDD via the drain-to-source path of a transistor, such as 23–0 as connected to column $b_0$, transistor 23–1 as connected to zone or column $b_1$ etc. The set-up signal $\phi$2T controls the gates of these transistors 23–0 etc. Upon decay of set-up signal $\phi$2T a data extraction column connected to *a* developed bit cell transistor that has its respective gate connected to the respectively addressed data matrix row and gate line, is discharged. A data extraction column which does not have a developed bit cell transistor at the intersection with the addressed data matrix row and gate line, remains charged.

In the illustrated example columns $b_0$ and $b_{70}$ (and possibly others) will be discharged upon addressing the word location of lowest address code (addressing gate line $a_0$). The discharge of a data extraction column occurs after the non-addressed lines, (e.g., $a_3$ . . . $a_{31}$) have been discharged, as set-up signal $\phi$2T persists beyond the duration of set-up signal $\phi$1T. In other words, all decoder nodes but one of the memory address gates (matrix rows) are discharged first, before the non-discharged data matrix row can take effect for controlling the gates of developed transistors along that row, and only thereafter, upon release of $\phi$2T, will data extraction columns discharge along which there are gated-on, developed and addressed bit cell transistors (such as 21).

The selective charge state of columns $b_0$ to $b_{71}$ as resulting from addressing and selective discharge persists throughout the next operating phases during which the content of the addressed word location, as now presented on the columns $b_0$ to $b_{71}$, or a portion thereof, is called up in sequential bytes. It should be noted that the address signals $A_1$, etc., can be removed when the signal E turns false. E $\rightarrow$ $\bar{E}$, The particular gating operation of the previously addressed matrix row is no longer needed. The discharged data columns will not recharge and the data columns that were not discharged are isolated and will remain charged. There will be some leakage discharge but that leakage is not noticeable for many clock cycles. A minimum period for charge retention must extend over at least nine clock cycles for a 5 Mhz clock, that period is about 2 microseconds. Actually, the charges are retained for much longer periods so that there will be no problem.

As outlined above, and as will be justified below, bit cell transistors are not at all developed along columns $b_8$, $b_{17}$ . . . $b_{71}$ so that these columns are *never* discharged. This is true only for a chip that does not operate with a companion chip of the interleaved mode, or if there is a companion chip, the latter is the one that lags by half a clock cycle. In that case, the latter chip has no developed transistors along columns $b_0$, $b_9$, . . . $b_{63}$.

The data output columns $b_0$ to $b_{71}$ lead to the read select circuit 30. As stated, there are eight bit select circuits 30–0, . . . 30–7 commensurate with the eight bits of a byte to be read-out concurrently, i.e., in parallel. Of these eight bit select circuits, one thereof, 30–0, is developed in detail. The purpose of this bit select circuit 30–0 is to sequentially select the nine bits on columns $b_0$ to $b_8$ (or a lesser number) to serve as lowest order bits in nine (or less) sequential bytes as extracted from the entire content of an addressed word location. Thus, circuit 30–0 has the nine columns $b_0$ to $b_8$ as inputs. A similarly constructed circuit 30–7 has columns $b_{63}$ to $b_{71}$ as inputs, etc., for selection of the respective eighth order bit in each of the bytes of the byte string to be extracted.

Each one of the columns $b_0$ to $b_8$ connects to the respective gate of a transistor, 31–0 to 31–8. These transistors have interconnected drain electrodes and are connected therewith to phase clock line $\phi$1. Each transistor has its respective source electrode connected to the drain-to-source path of a counter controlled transistor; in particular, a transistor 32–0 is gated on by the count state signal in counter output line C0, a transistor 32–1 responds to C1, etc., transistor 32–8 to the count state signal in line C8,

Each pair of series connected transistors, such as 31–0, 32–0 or 31–1, 32–0, etc., constitutes an "AND" gate of the particular merge section 30–0 (compare with FIG. 2). The connection in parallel of these nine transistor pairs constitutes the OR-connection. The interconnected source electrodes of transistors 32 are connected to a node 35–0 via a transistor 33. Node 35–0 is charged by and during each phase $\phi$1 as controlling a transistor 34. Phase signal $\phi$2 is the data matrix column sensing phase, with the counter state signals providing the selection of the column sensed. Thus, during the next phase clock $\phi 2$, transistor 33 is conductive and discharges that node 35–0, provided one of the AND gates is gated on.

In detail, the counter signals C0, C1, will gate open one of the transistors of the plurality 32. If the respective one is connected in series with a transistor of the plurality 31, whose gate has rendered the transistor conductive by operation of negative charge on the respective data column node 35–0 is discharged into the line that previously held $\phi 1$ but is now grounded. If during a $\phi 2$ signal none of the transistors 31–32 provides a serially conductive path to that line, node 35–0 retains its charge.

Node 35–0 establishes the output of bit selection circuit 30–0. The other selection circuits have similar nodes as stated, and the charge states of these eight output nodes at the end of $\phi 2$ represent the called up byte.

The first clock cycle ($\phi 1$, $\phi 2$, $\phi 3$, $\phi 4$) for byte calling begins upon decay of gating signal E. Actually, at least one full clock cycle is already required during the signal E. The first byte is called up during the clock cycle following E → $\bar{E}$. The reason for this function of signal E is not immediately apparent but flows from operation of counter 50 to be described below. Prior to decay of E, signal $\phi 2$T has already decayed so that some of the columns $b_0$ to $b_{71}$ remain charged, others may have been discharged, as was outlined above, and see, for example, columns $b_0$, $b_{70}$, and others, upon addressing word location (00 . . . 0). Hence, transistor 31–0 is *not* gated on. As we consider the *first* normal byte extraction cycle, the counter 50 has a state so that C0 is negative (true), and transistor 32–0 is rendered conductive. Upon $\phi 1$ node 35–0 is charged via transistor 34. Upon $\phi 2$ node 35–0 is *not* discharged because out of the plurality 32 only transistor 32–0 is conductive, but its serially connected AND gate supplement, transistor 31–0, is not conductive. Similar operations occur in parallel in all selection circuits 30. In particular, during the first normal byte extraction cycle, the eight columns $b_0$, $b_8$, $b_{17}$ . . . $b_{63}$ are coupled via counter control signal C0 to the eight selection circuits 30–0 . . . 30–7 to determine the charge state of their output nodes (35–0, etc.). The counter 50 provides the *one* enabling signal, presently C0, to each read-out circuits 30-1 . . . 30–7, so that eight bits are presented concurrently upon phase time $\phi 2$. If the respective selected data column was found *dis*charged, the respective output node (such as 35–0 in 30–0) remains charged, if a data column that is called was found charged, the output node is *dis*charged upon $\phi 2$.

Buffers, such as 40–0, have a first transistor 41 coupled to node 35–0 rendering the transistor conductive or not. Supply voltage VDD is serially connected to transistor 41 via a transistor 42 upon phase time $\phi 3$ to control an output transistor 43 that, in turn, connects to the output terminal OUT-0. The node established by the connection of the gate of transistor 43 to the source electrode of transistor 41 is always discharged upon $\phi 1$. That node is recharged via 42 and 41 if a charge was retained on node 35–0 during the preceding pulse $\phi 2$. The node on the gate of transistor 43 retains such charge (or the discharge state) for phase time $\phi 3$ as well as for the following phase $\phi 4$, i.e., for the 100 nanoseconds of half a clock cycle. It is apparent that the eight output buffers provide the bits of one byte concurrently for that period. In particular, the first byte is presented to the *second* half of a full clock period following decay of set up signal E. Presentation of a byte is flanked by pauses of like duration (100 nanoseconds).

Counter 50 provides scanning signals sequentially in lines C0 to C8 in nine cycles to interrogate the charge state of all data columns, eight columns at a time. The counter 50 has a plurality of stages 50–0, 50–1, etc., as indicated. As long as $\bar{E}$ = 1 (negative, and prior and after set-up), the counter is in effect disabled. Upon $\phi 3$, all outputs C0 to C8 turn negative as nodes. *Prior* to set-up, *all* of these nodes are discharged via transistor circuitry 51-0, 51-1, etc., upon $\phi 4$ and remain discharged (ground potential) for the next $\phi 1$ and $\phi 2$ phases. *During* set-up ($\bar{E}$ = 0, ground potential) all of the discharge circuits 51 are disabled, and *one* of the counter stages is prepared so that its output node (C0 or C1, or C2, etc.) remains charged as will be described shortly, so that one of the counter stages is in the set state.

A counter stage 50–x is *in* the set or *on* state if during a clock $\phi 2$ its output node $C_x$ holds a negative charge. After set-up, shift circuits 52–0, 5201, etc., control shifting of the set state of the counter during phase times $\phi 2$ to shift the *on* state from one stage to the next one. For this, the shift circuits control transistors 53–1, etc., through which run the discharge paths for the nodes C1, etc. Shifting is provided in that the shift circuit of the stage that is on blocks the next control transistor. Thus, during the first byte call cycle, C0 was on, C1 to C8 were discharged. during $\phi 1$–$\phi 2$ of that cycle, circuit 32–0 closes transistor 53–1. During $\phi 3$ all nodes C0 to C8 are charged and on $\phi 4$ nodes C0, C2 . . . C8 discharge.

Generally, if a counter stage having output node C*x*–1 was *on* during a clock cycle, then upon $\phi 4$ of that clock cycle the respective output node Cx of the next stage is not discharged, but the node Cx-1 *is*. The shift circuit **52–*x* opens a transistor 53–*x*+1 of the next stage, if stage 50–*x* was not set. If stage 50–*x* was set, circuit 52-x closes transistor 53–*x*+1** to inhibit discharge of node line C*x*+1. This way, the set stage of the counter shifts from stage to stage, but *not* on a recycling basis. Bytes are called up in sequence accordingly, one per clock cycle.

The counter starts as follows: During set-up, E = 1 (negative) again all nodes C0 . . . C9 charge on $\phi 3$ but *none* of them discharges via any of the circuits 51. Instead, discharge is controlled from the start counter decoders 65. Each counter stage (except the last one) has such a decoder, decoder 65–0 for the first stage is illustrated in full. Stage 65–1 is shown in block, the others are indicated only schematically and summarily. Decoder 65–0, as the others, has three transistors connected in parallel to each other between a phase line for $\phi 3$ and a transistor 55–0 that connects to node line C0. Transistor 55–0 is gated open on E = 1. The three decoder transistors receive the signals $\bar{B}_1$, $\bar{B}_2$, $\bar{B}_3$, but also only for E = 1. Thus, none of the transistors of decoder 65–0 will be conductive on $B_1 = B_2 = B_3 = 1$. That, in turn, defines, on a binary scale, the byte string length sought to be extracted from an addressed word location. The other decoders 65–1, etc., respond to signals corresponding to a smaller byte string number. For full word read-out and call-up of all bytes therein, it is always decoder 65–0 that responds by *non*-conduction of all of its transistors.

Counter starting operation is best explained on the basis of full byte string call up and extraction in that during set-up (E = 1) the count start code applied is (1, 1, 1), for decoder 65–0 to have all transistors non-conductive. Thus, the decoder 65–0 inhibits discharge of line C0 during $\phi$4, while E is still true. All of the decoders for the other counter stages (such as 65–1, etc.) have at least one conductive transistor following $\phi$3 upon E = 1 (set-up), so that nodes C1, . . . C8 all discharge during $\phi$4 (without special phase gating) through the several decoders, and into the phase line for $\phi$3 that is now grounded. This decoder controlled discharge operates *only* during set-up. For a different byte string length code, a different decoder will have all its transistors non-conductive to inhibit discharge of the respective count stage output node C*x*. This way, counter 50 is caused to start in a selected count state upon E → $\bar{E}$.

With less than full byte string length selected, for example, node C1 does *not* discharge on $\phi$4 and upon E → $\bar{E}$ line C1 stays negative for the following signal $\phi$1 of the first cycle to control select gating of data columns $b_1$, $b_{10}$, etc. During $\phi$2 of that first cycle, shift circuit 52-1 controls transfer of the next count state by causing discharge of node C2 to be blocked. During the next clock $\phi$3, *all* of the node lines C0 to C8 are charged again, but during the last phase signal $\phi$4 of the first clock and byte call cycle node line C2 does *not* discharge. However, C0, C1, C3, etc., are all discharged via 51–0, 51–1, etc., as now $\bar{E}$ = 1 again. Count stage shifting then proceeds from stage to stage in accordance with subsequent sequential call cycles.

In order to tie the operations together, consider briefly this summary. A counter outout signal is available from the beginning of a signal $\phi$3 to the end of the next signal $\phi$3. Gating operation in the bit select circuit 30, however, is needed only during the particular phase $\phi$2 in between, when the respective transistors 33 couple the respective pre-charged output nodes 35 to the gating circuitry 31-32.

Proceeding now to the description of the termination operation, a regular ROM chip in accordance with an example of the preferred embodiment of the invention has eight empty locations for each word. As was mentioned above, there are no transistors on columns $b_8$, $b_{17}$, . . . $b_{71}$. Thus, upon shifting of the counter 50 so that the output line C8 provides the select enabline, *all* output nodes 35, such as node 35–0 illustrated, and the respective ones of all the other data output circuits are discharged (zero detection). An all zero byte thus extracted is used for termination control.

The gate circuit 71 of latch out and reset control part 70 responds upon $\phi$4 of that last read cycle. The "all zero" detector 71 has eight transistors 71–0 to 71–7, and they are connected between phase line $\phi$3 and one electrode of a transistor 73. The gates of these eight transistors 71–0 to 71–7 receive respectively the signals of output nodes 35–0, . . . 35–7.

The latch circuit includes a control line 72 that serves as node which is charged on $\phi$3 and can be discharged via the $\phi$4 gated transistor 73. The discharge is permitted as long as the bits of the byte set into "all zero" detector 71 are *not* all zeros, so that at least one of the transistors of circuit 71 is gated on to complete a discharge path to the phase $\phi$3 line, as that line has ground potential after $\phi$3 (i.e., during $\phi$4). Line 72 leads to a transistor 36–0 in circuit 30–0, and to other, similarly connected transistors in selection circuits 30–1, etc., to discharge, always, the nodes 35–0, etc., during all following signals $\phi$2, these nodes having been charged during each preceding pulse $\phi$1.

Upon detection of an all-zero byte, during the extraction column sensing phase $\phi$2, while C8 is true, node-line 72 is not discharged on the following $\phi$4, so that conduction of bypass transistors 36 persists. Therefore, as node 35–0 is charged upon $\phi$1 as always, it will discharge immediately upon $\phi$2 in each clock cycle following the last byte call and extraction phase. Node line 72 holds its charge which is replenished upon each $\phi$3, to re-enforce the zero condition latching. Thus, latching is cyclically re-established and continues until the next set-up period.

A circuit 75 controls a transistor 74 that is connected parallel to all eight zero-byte detection transistors 71. Transistor 74 is rendered conductive only during set-up by signal E during phase $\phi$4 thereby breaking the latch! The latch control line 72 leads also to a circuit 76 providing phased buffering to extract from the circuit the then externally avaliable latching signal L.

The utilization of a particular format byte (e.g., an all-zero byte) for termination of a read-out and byte call sequence has general application. Such a control byte can be placed anywhere within a word location and may thus serve as a subdivision thereof. In the general case, the memory can be made random accessible to individual bytes, double bytes etc. The word location is addressed through the A-bits, the byte location (or the first one of two or three etc.) is addressed through B-bits and the counter or register 50 progresses until calling on an all-zero byte which may be the next one or the next thereafter: (i.e., not necessarily the last one!)

Latch conditions for byte string extraction termination can be established otherwise. Parallel to transistor 36, there is a transistor 37 that is rendered conductive directly by the external read discontinue signal D. The signal D, as produced externally, may be the result of byte string counting (counter 90 of FIG. 1). This is a convenient and powerful tool to extract variable length byte strings from a word location. Each word location has eight byte strings (the ninth is not data). The signals B1, B2, B3, define a particular beginning, with B1 = B2 = B3 = 1 defining actually one byte string boundary within any particular word location. Normally, all of the remaining byte strings will automatically be extracted from the word location.

By external timing or counting of the number of bytes extracted, the read sequence can be interrupted timely, through appropriately timed production of signal D, before the normal end has been reached. In terms of internal counting, the counter 50 can be started to begin the byte string extraction sequence from any byte within a word location; through external production of signal D, the read operation can be terminated before counter 50 has reached its highest count state.

The third zero latching operating occurs also at the end of a byte string read sequence. As far as the particular circuit is concerned, this is a redundancy provision. Its particular purpose will be described later. The ninth stage, 50–8, of the counter (also drawn in detail) is used to control sampling and addressing of the last columns, e.g., $b_8$, . . . $b_{71}$, etc., defining the last byte in the selection circuit 30. However, that counter stage is not associated with a byte string length decoder, nor does it carry out any transfer to another stage because the counter does not recycle. However, it *has* a transfer stage 52–8, and upon $\phi$4 of the last (ninth) byte call cycle, that transfer stage 52–8 controls a circuit 54 so that a transistor 38 in circuit 30–0, and others in circuits 30–1 to 30–7 are rendered conductive; transistor 38 is connected parallel to transistors 36 and 37, for coupling transistor 33 directly to phase line $\phi$1. This way, node 35–0 (and the others in parallel) are and remain discharged upon $\phi$2 in the tenth byte call cycle (after a charge phase $\phi$1), and particularly during the phase $\phi$4 thereof an all-zero byte is simulated on circuit 71 causing the zero condition to latch.

As to the illustrated circuit, this third zero latching control is not only redundant but belated. It obtains, however, significance if one considers FIG. 3. The two interleafedly operating chips differ in that the one operating one-half bit or clock cycle earlier does *not* have an all-zero byte in the data columns always called upon during *its* ninth byte call cycle. The tenth byte call cycle of that chip overlaps with the ninth byte call cycle of the other chip, so that *both* latch individually during the same clock cycle. The chip with the ninth *data* columns, however, has its *first* columns constructed to hold all zeros for the following reason:

This second chip receives the same phase signal $\phi$1 and $\phi$3 but exchanged. Hence, for the second chip, operation is modified by substituting $\phi$, → $\phi$3, $\phi$3 → $\phi$1, and correspondingly also $\phi$2 → $\phi$4; $\phi$4 → $\phi$2. As a consequence, that second chip is operated for data sampling ($\phi$3 – $\phi$4) of its nodes 35–0, . . . etc., at a time, data have not yet read and copied into these nodes. However, the counter shifts to the next count state (1) anyway. Thus, the columns of the first byte are defacto not read but skipped. Therefor, they do not need to contain any developed transistors. On the other hand, for a full format, the ninth columns, i.e., the ninth byte should be a data byte, so that a two chip system has maximum string length of $2^4 = 16$ bytes per (144 bit-) word as addressable by a single address codes ($A_1 \ldots A_5$). In the, thus, modified chip (modified only as to data *content* of its data matrix), the circuit 54 *is* needed to obtain latching. For reasons of economics (mask design) it is more practical to have this control circuit provided on all chips so as to avoid differences in layout of the circuit generally, any difference being restricted to data matrix content.

A brief system summary of operation has been given above on basis of the block diagram of FIG. 1, a different summary will now be given on basis of the detailed circuit of FIG. 5. Upon set-up, phase signals $\phi$1T and $\phi$2T as well as enabling signal E are raised concurrently. The particular addressing signals $A_1$ to $A_3$ and $B_1$, $B_2$, $B_3$, may occur later but prior to release of any of these set-up signals. Clock $\phi$1, $\phi$3, externally produced, may run continuously, even prior to set-up. The clock does not impede persistance of the latch condition.

Signal E pre-charges the inverters for processing of the addressing signals in that the complements of these signals are now produced in the inverters 10 and 60, and signals $\bar{A}_1$, $\bar{A}_2$, . . . , $\bar{B}_3$, are made available. Signal E also breaks the reset latch and inhibits counter 50 from assuming any state that is not determined by the decoders 65. Signal $\phi$1T pre-charges the address decoders 15, in particular transistor 17 and others all pre-charge all of the nodes on addressing lines $a_0$ to $a_{31}$. Signal $\phi$2T pre-charges all data extraction columns $b_0$ to $b_{71}$. Concurrently, signal $\phi$2T biases column 22–0 and others, so that the data extraction columns cannot yet discharge!

Upon release of $\phi$1T (which occurs first), all but one of the word addressing lines $a_0$ to $a_{31}$ are discharged through the decoders 15. The one decoder has all of its respective five parallely connected transistors (such as 16–1, etc.) non-conductive by operation of the particular addressing code so that discharge of the particular line $a_x$ is inhibited ($x$ being the decimal equivalent of the word addressing code and one of the numbers 0 to 31). Next, $\phi$2T is released so that all P-zones such as 22 are clamped to ground potential, while columns 20–0 ($-b_0$) to 20–71 ($-b_{71}$) are sleectively discharged, depending upon development or not of transistors underneath addressing line $a_x$ where crossing the data columns 20–0 to 20–71. Thus, upon release of $\phi$2T the data extraction columns hold the entire content of the addressed location to the word level, 72 bits in all.

The last set-up signal to release is signal E to make sure that the decoders 15 remain conductive for clamping the non-addressed date lines of the data matrix to ground until the particular data columns to be discharged have, in fact, been discharged. The signal E, as the longest, needs to have a duration of but one full clock cycle, during which period all decoders, all addressing rows and all data extraction columns have been charged, while release of $\phi$1T and $\phi$2T provides selective discharge as stated. Hence, data is ready for call up about 200 nanoseconds following the beginning of addressing and set up.

The release of signal E, i.e., the flank E → $\bar{E}$, must occur in particular synchronism with the clock $\phi_1$ – $\phi_3$ as externally produced and applied. In particular, that release flank coincides with the leading edge of $\phi$1 of the first byte call cycle. During phase $\phi$3 preceding the release of E, all counter outputs (C0 – C9) are set to the "one" state (negative). E must persist beyond the $\phi$4 signal, and is released on or about $\phi$1 at the latest. All but one lines C0 to C9 discharge through the decoders 65 during $\phi$4 (still E = 1), as the circuits 51 are still blocked. The one counter line was not discharged corresponds to the byte string length number as defined by the B1 – B2 – B3 code, that caused the respective decoder 65–Y to block the discharge of line C*y* (Y = 0, . . . , 7).

During signal $\phi$1 following the release of E, the first byte call cycle begins. At first, circuits 52 are prepared so that one thereof will be able to shift the counter state. Also, all of the eight output nodes, such as 35–0, are precharged. During the next phase $\phi$2 the eight nodes 35–0 to 35–7 are selectively discharged in representation of the first byte (as defined by Y) and as selected for read-out by the counter line C*y*. The discharge depends on whether both of the particular transistors in a select circuit, such as 31–Y and 32–Y, are rendered conductive. Transistor 32–Y *is* rendered conductive by the counter output CY, transistor 31–Y is rendered conductive *only* if data column *b*Y was not discharged. These considerations hold true for all eight bit select circuits, each receiving the gating signal CY.

The read buffers 40 present these eight bits for external extraction during the two phases $\phi$3 and $\phi$4 of the first read cycle. Concurrently with $\phi$3, all lines C0 to C9 are charged but only the next counter line CY + 1 is inhibited from discharing by operation of the particular circuit 52–Y.

Each $\phi$1 to $\phi$4 sequence represents a call cycle for a byte. On $\phi$1 the output nodes 35–0 to 9 are pre-charged and the transfer circuits 52 are prepared. Upon $\phi$2 the output nodes 35–0 in circuits 30–0, etc., are selectively discharged in dependence upon the charge state of the particular data column, etc., as currently selected by the byte counter. Upon $\phi$3, the byte just read is outputted via the buffers, while all counter nodes C0 to C8 are pre-charged, to be discharged (except one) on $\phi$4.

The byte counter shifts from state to state for each byte cycle until either the external signal D, or detection of an all-zero byte, or end of counter operation is reached, whichever occurs earlier. In either case, circuits 71 maintain latch conditions (conductor of transistor 36) to maintain zero output conditions in the circuit throughout.

I claim:

1. In an integrated circuit chip of the MOS variety, for use as read only memory, the combination comprising:

a plurality of runs in the chip provided as zones of particular conductivity, each run developed to establish a node, and isolated from each other;

circuit means on the chip connected to said runs of the plurality for charging the respective nodes for a limited period of time;

at least one gate plating across the runs of the plurality, there being transistors of the FET variety developed in locations adjacent the gate plating where crossing a sub-plurality of the runs of the first plurality;

FET circuit means for applying a gating potential to the gate plating persisting beyond the period of time to obtain discharge of the sub-plurality of runs; and FET circuit means responding to the change state of all the runs of the first plurality at a time succeeding said period.

2. In a circuit chip as in claim 1, including circuit means on the chip for charging all of the gate platings as nodes; and address decoder means for discharging all but one of the gate plating nodes prior to termination of said period of time.

3. An integrated circuit memory comprising:

a first and a second memory matrix, each matrix having a plurality of addressing rows and extraction columns, rows and columns intersecting respectively in locations to the bit level, the plurality of locations of each matrix respectively arranged along rows and columns of the respective matrix, the locations of the plurality respectively storing data bits;

addressing means responsive to address codes and connected for concurrently addressing one row each of said first and second matrices; byte extracting and columns selector means for alternatingly extracting bytes, plural bits in parallel being a byte, from the locations on the said addressed rows, through selection of columns of said columns;

clock means providing alternating clock signals and connected for alternatingly operating the said extracting and selector means to obtain the alternating extraction of bytes from the first and second matrices; and merge means connected to merge the bytes extracted from the first matrix with the bytes extracted from the second matrix to obtain a string of bytes composed on the alternatingly extracted bytes.

4. A memory as in claim 3, and including second addressing means connected to receive a starting address for the sequence of extraction as provided by the selector means.

5. In a memory circuit on an integrated circuit chip having plural, individually addressable word locations, each word location holding a plurality of bytes, each byte having a plurality of bits, a read-out circuit comprising:

first means on the chip for defining a data matrix having addressing rows and data columns, the intersection of a row and of a column defining a memory location; one byte for at least one word location defined by a particular combination of bits;

second means on the chip responsive to a first, externally applied addressing code and connected for addressing one of the rows, pursuant to such addressing the content of the memory locations is available on the columns;

third means on the chip and including shift register means for sequentially calling on the columns for one byte at a time and providing bit value defining signals representing one respective byte for external extraction of the bytes as provided in particular sequence;

fourth means on the chip connected to the third means for establishing a particular beginning of a byte call sequence; and fifth means responsive to the particular bit combination when read and terminating the byte call sequence.

6. A memory as in claim 5, the fourth means including a decoder connected to be responsive to a second, externally applied byte addressing code permitting beginning of a byte call sequency with a byte ahead or behind of the particular byte, depending upon the byte addressing code as applied.

7. A memory, comprising:

a first chip and a second chip, each chip having addressing inputs interconnected externally to receive similar addressing signals;

each chip having output lines, interconnected externally to receive data from either chip;

a memory matrix on each chip having plural locations to the word level each connected to receive the addressing signals and to access one word location on each chip;

byte string extraction means on each chip operating to provide a byte sequence from the respectively accessed word location to the respective output lines;

clocking means on each chip for receiving a pair of interspaced clock pulse trains and providing the bytes in synchronism with one of the trains as received, followed by a pause in synchronism with the respective other train as received; and means external to the chips for providing two clock pulse trains and connected for applying them in inverse order to the clocking means of the two chips.

8. A memory as in claim 7, each chip including means for receiving additional addressing signals and operating the respective byte string extraction from comparable places in each of the respectively accessed word locations on both chips; and means on each chip to provide for independent but concurrent termination of byte string extraction.

9. In a memory circuit on an integrated circuit chip having plural, individually addressable word locations, each word location holding a plurality of bytes, each byte having a plurality of bits, a read-out circuit comprising:

first means on the chip for defining a data matrix having addressing rows and data columns, the intersection of a row and of a column defining a memory location;

second means on the chip responsive to a first, externally applied addressing code and connected for addressing one of the rows, pursuant to such addressing the content of the memory locations is available on the columns;

third means on the chip connected for sequentially calling on the columns for one byte at a time and providing bit value defining signals representing one respective byte for external extraction of the bytes as provided in particular sequence;

fourth means on the chip connected to the third means for establishing a particular beginning of a byte call sequence, and fifth means on the chip for establishing a particular end for the byte call sequence.

10. A memory as in claim 9, the fourth means including a decoder means connected to be responsive to a second externally applied byte addressing code, the third means including byte call counter, the fourth means presetting the counter to a state corresponding to the second code.

11. A memory as in claim 9, the fifth means including means responsive to a particular control byte when called to terminate the byte call sequence.

12. In a memory on an integrated circuit chip having a plurality of word locations, each word location holding a plurality of bytes, each byte having a plurality of bits, the combination comprising:

first means on the chip defining a data matrix that includes a plurality of columns of bit cells, each column of cells including a bit extraction column, one extraction column per bit position in a word location, the data matrix including a plurality of addressing rows, one row per word location and coupled to all columns of cells, one bit per column of cells;

second means on the chip defining a decoder network responsive to address bits applied externally to the chip, and having a plurality of outputs respectively coupled to the rows of the plurality, and including means to provide an addressing signal on one of the rows in response to a particular combination of applied address bits, so that the matrix applies the bits of the addressed location to the extraction columns and sustains the bits therein;

third means on the chip defining a counter progressing at a particular sequence thereby providing sequentially different enabling signals, while the data bits are sustained on said extraction columns;

fourth means connected to all of the extraction columns and to the third means and selecting the bits on some of the extraction columns in parallel and in response to one of the enabling signals from the counter, and providing a string of bytes in response to progression of the counter and of the enabling signals as provided by the counter; and fifth means for presenting the bits of a byte concurrently and the bytes as sequentially provided by operation of the fourth means, as a byte string for use external to the chip.

13. A memory as in claim 12, including another decoder on the chip responsive to a code representing a particular beginning of a byte string to be extracted from a word location, and coupled to the counter to preset the counter to a state from which to progress.

14. A memory as in claim 12, and including sixth means responsive to completion of byte string extraction for providing reset operation on the chip, the sixth means connected resetting the counter to a starting condition.

15. A memory as in claim 12, including another decoder on the chip coupled to the extraction columns as selected by the fourth means and responsive to a particular byte for terminating the readout from the addressed word location.

16. A memory as in claim 12, including means responsive to an externally applied code for presetting the counter to a particular state corresponding to a byte number within a word location as defined by the address bits as applied to the second means; and means responsive to a particular bit combination in a byte on bit cell columns when selected by the fourth means, to terminate readout of the word location.

17. A memory as in claim 12, including means for preparing all word locations for readout, by addressing all rows, the second means eliminating the preparation for the nonaddressed row so that only the one row remains addressed.

18. A memory as in claim 12, and including a second chip similar to the integrated circuit chip and connected to receive the same address bits and having an output connected in parallel to the first means, the two chips including clocking means each for providing byte string extraction in response to two externally applied, alternating clock pulses, the two clocking means receiving alternating pulses in inverse order.

19. A memory as in claim 12, wherein the chip has field effect transistors of the insulated gate variety constituting the active elements, the data matrix having runs of zones of particular conductivity along the cells and constituting the extraction columns, the matrix rows constituting gate platings, under which transistors are or are not developed adjacent the several runs in selective representation of stored data.

20. A memory as in claim 19, wherein the extraction columns constitutes nodes, there being a plurality of additional runs of zones disposed so that each extraction column of the plurality is juxtaposed to an additional run, the bit cells transistors developed in between the respective extraction column and the juxtaposed additional run, the nodes being precharged by an externally applied signal, extraction columns being discharged into the respective additional run upon release of the external signal if there is a bit cell transistor of said transistor on such extraction column that is gated on by an addressing signal in the matrix row gate plating of such a transistor.

21. A memory as in claim 19, the extraction columns constituting nodes, the chip including means connected to be responsive to a first externally applied signal precharging all of the nodes, and means in association with each of the extraction columns and the transistors, if any, along the respective extraction columns to obtain selective discharge of extraction columns through bit cell transistors gated on by the gate plating of a matrix row.

22. A memory as in claim 21, each gate plating of a matrix row constituting a node, all of the latter nodes being charged in response to a second externally applied signal, the second means operating to discharge all but one of the latter nodes in response to address bits and upon release of the second signal, the first signal being released subsequently.

23. A memory as in claim 21, there being a particular plurality of columns of cells, equal in number to the number of bits in a byte having always a particular charge state upon release of the first signal, the columns of the particular plurality being called last by operation of the third and fourth means to provide a particular byte, and means responsive to the particular byte, to provide a termination signal.

* * * * *

UNITED STATES PATENT OFFICE
CERTIFICATE OF CORRECTION

Patent No. 3,771,145 Dated November 6, 1973

Inventor(s) Patricia P. Wiener

It is certified that error appears in the above-identified patent and that said Letters Patent are hereby corrected as shown below:

In the Title, delete the words "ADDRESSING AN".

Signed and sealed this 16th day of July 1974.

(SEAL)
Attest:

McCOY M. GIBSON, JR.
Attesting Officer

C. MARSHALL DANN
Commissioner of Patents

US003771145A

REEXAMINATION CERTIFICATE (2416th)

United States Patent [19]

Wiener

[11] B1 3,771,145

[45] Certificate Issued Nov. 1, 1994

[54] INTEGRATED CIRCUIT READ-ONLY MEMORY

[76] Inventor: Patricia P. Wiener, 12 Thornwood Rd., Armonk, N.Y. 10504

Reexamination Requests:
No. 90/003,110, Jun. 30, 1993
No. 90/003,236, Oct. 29, 1993

Reexamination Certificate for:

| | |
|---|---|
| Patent No.: | **3,771,145** |
| Issued: | **Nov. 6, 1973** |
| Appl. No.: | **111,193** |
| Filed: | **Feb. 1, 1971** |

Certificate of Correction issued Jul. 16, 1974.

[51] Int. Cl.[5] ........................ G11C 17/00; G11C 7/00

[52] U.S. Cl. .................................... 365/240; 365/104; 365/203; 307/270; 307/449; 307/453; 307/481

[58] Field of Search .................. 365/104, 189.12, 203, 365/230.09, 239, 240; 307/270, 449, 453, 481

[56] References Cited

U.S. PATENT DOCUMENTS

| | | | |
|---|---|---|---|
| 3,109,162 | 10/1963 | Wolensky | 395/425 |
| 3,331,061 | 7/1967 | Marcus | 365/230.04 |
| 3,432,812 | 3/1969 | Elfant | 395/425 |
| 3,463,880 | 8/1969 | Corson | 358/459 |
| 3,483,528 | 12/1969 | Koerner | 365/49 |
| 3,533,088 | 10/1970 | Rapp | 365/230.06 |
| 3,560,942 | 2/1971 | Enright, Jr. | 365/233 |
| 3,613,055 | 10/1971 | Varadi | 365/203 |
| 3,618,050 | 11/1971 | Heeren | 365/231 |
| 3,619,534 | 11/1971 | Varadi et al. | 365/78 |
| 3,659,275 | 4/1972 | Marshall | 395/575 |

OTHER PUBLICATIONS

W. F. Beausoleil, "Shift Register Storage", IBM TDB, vol. 13, No. 5, Oct. 1970, pp. 1336–1337.

A. M. Bracco et al., "Write-Once Read Only Store", IBM TDB, vol. 13, No. 5, Oct. 1970, p. 1308.

S. A. Abbas, "Electronically Encodable Read-Only Store", IBM TDB, vol. 13, No. 6, Nov. 1970, pp. 1426–1427.

C. Reed, "An MOS Read-Only Memory Character Generator", Microelectronics Magazine, Mar. 1969, pp. 24–29.

Alphanumerical Character Generation, by I. J. Ella, Conference on Computer Technology, Jul. 18–20, 1967, The I.E.E. Electronics Division and the Institution of Electronic and Radio Engineers, pp. 222–229.

Applying The Versatile MOS ROM, by John Wunner & Ron Colino, Electronic Products, Jan. 1970, vol. 12, No. 9, pp. 35–40.

Megabits and Microseconds, EDN, Apr. 1, 1969.

*Primary Examiner*—Joseph A. Popek

[57] ABSTRACT

A read-only memory of the MOS variety with address decoder, memory matrix and internal control for byte string extraction and sequencing. Beginning of a byte string is separately controlled, termination of extraction is redundantly established. Two chips can operate in phase opposition for doubling the overall byte string extraction rate from locations identified by a single address.

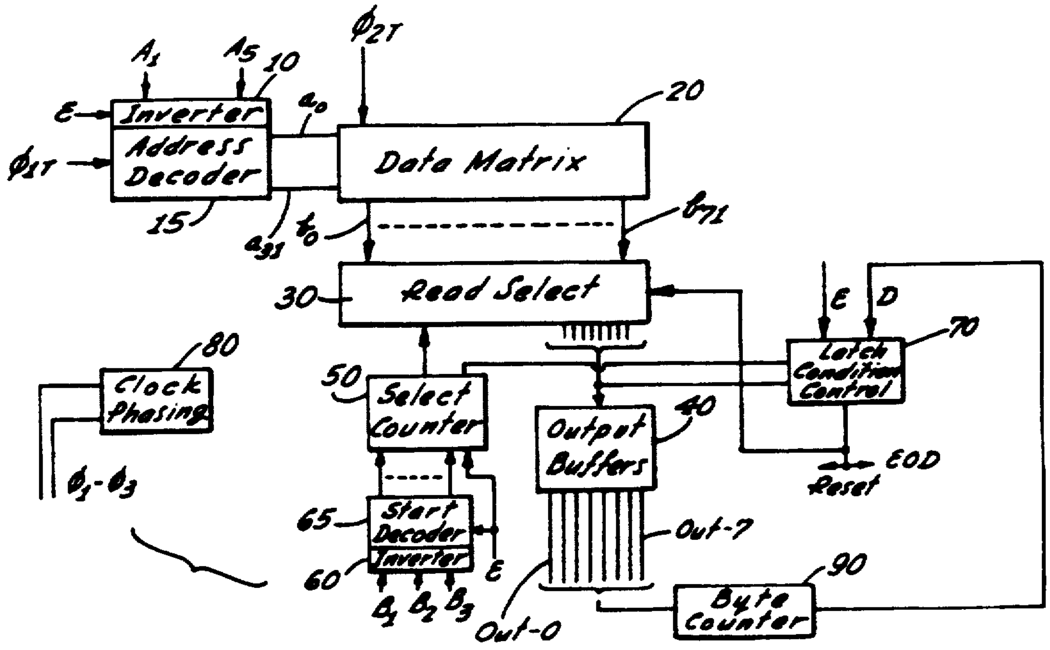

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 23 is confirmed.

* * * * *